United States Patent
Yalovsky et al.

(10) Patent No.: US 7,373,603 B1
(45) Date of Patent: May 13, 2008

(54) METHOD AND SYSTEM FOR PROVIDING DATA REFERENCE INFORMATION

(75) Inventors: Mark Yalovsky, Seattle, WA (US); Peter Patrick Baer, Duvall, WA (US); Timothy D. Sellers, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 311 days.

(21) Appl. No.: 10/664,740

(22) Filed: Sep. 18, 2003

(51) Int. Cl.
*G06F 15/00* (2006.01)
*G06F 3/00* (2006.01)

(52) U.S. Cl. ............... 715/530; 715/513; 715/770; 709/203

(58) Field of Classification Search .......... 715/530, 715/526, 513, 769, 770; 709/219, 229, 203
See application file for complete search history.

(56) References Cited

U.S. PATENT DOCUMENTS

| | | | |
|---|---|---|---|
| 5,202,828 A | 4/1993 | Vertelney et al. | 714/810 |
| 5,530,794 A * | 6/1996 | Luebbert | 715/524 |
| 5,537,628 A * | 7/1996 | Luebbert | 715/522 |
| 5,563,996 A | 10/1996 | Tchao | 715/521 |
| 5,625,783 A | 4/1997 | Ezekiel et al. | 395/352 |
| 5,734,915 A | 3/1998 | Roewer | 395/773 |
| 5,752,254 A * | 5/1998 | Sakairi | 715/530 |
| 5,760,768 A | 6/1998 | Gram | 345/333 |
| 5,765,156 A * | 6/1998 | Guzak et al. | 707/100 |
| 5,778,346 A | 7/1998 | Frid-Nielsen et al. | 705/9 |
| 5,781,192 A * | 7/1998 | Kodimer | 715/770 |
| 5,801,693 A * | 9/1998 | Bailey | 715/769 |
| 5,838,321 A | 11/1998 | Wolf | 345/343 |
| 5,855,006 A | 12/1998 | Huemoeller et al. | 705/9 |
| 5,884,306 A | 3/1999 | Bliss et al. | 707/7 |
| 5,898,434 A | 4/1999 | Small et al. | 715/810 |
| 5,924,099 A * | 7/1999 | Guzak et al. | 707/100 |
| 5,940,078 A | 8/1999 | Nagarajayya et al. | 345/346 |
| 5,970,466 A | 10/1999 | Detjen et al. | 705/8 |
| 5,999,938 A * | 12/1999 | Bliss et al. | 707/102 |
| 6,002,402 A * | 12/1999 | Schacher | 715/810 |
| 6,065,012 A | 5/2000 | Balsara et al. | 707/102 |

(Continued)

FOREIGN PATENT DOCUMENTS

EP 0569133 A2 * 11/1993

OTHER PUBLICATIONS

IBM Corporation, "Dragging Marked Data to an Editor Window", Technical Disclosure Bulletin, vol. 34, No. 10B, pp. 202-203, Mar. 1992.*

(Continued)

*Primary Examiner*—William Bashore
*Assistant Examiner*—MaiKhanh Nguyen
(74) *Attorney, Agent, or Firm*—Merchant & Gould P.C.; Ryan T. Grace

(57) ABSTRACT

Reference information related to data that is copied using computer software is provided. The data can be copied from a first computer application to a memory. Reference information related to the data can also be copied to the memory. The copied data can be pasted to a second computer application. The reference information related to the data can also be pasted to the second application, so that the reference information can be reviewed along with the data. The data and reference information can also be copied and pasted among one or more documents using a single computer application.

18 Claims, 6 Drawing Sheets

U.S. PATENT DOCUMENTS

| | | | |
|---|---|---|---|
| 6,177,939 B1* | 1/2001 | Blish et al. | 715/770 |
| 6,249,283 B1* | 6/2001 | Ur | 715/764 |
| 6,269,389 B1* | 7/2001 | Ashe | 718/100 |
| 6,275,940 B1 | 8/2001 | Edwards et al. | 713/200 |
| 6,278,450 B1 | 8/2001 | Arcuri et al. | 345/334 |
| 6,309,305 B1* | 10/2001 | Kraft | 455/566 |
| 6,310,634 B1 | 10/2001 | Bodnar et al. | 715/854 |
| 6,411,311 B1* | 6/2002 | Rich et al. | 715/769 |
| 6,429,882 B1 | 8/2002 | Abdelnur et al. | 345/763 |
| 6,433,801 B1 | 8/2002 | Moon et al. | 345/840 |
| 6,490,634 B2* | 12/2002 | Coiner | 719/329 |
| 6,499,041 B1* | 12/2002 | Breslau et al. | 715/505 |
| 6,686,938 B1 | 2/2004 | Jobs et al. | 345/835 |
| 6,694,087 B1 | 2/2004 | Weaver | 386/52 |
| 6,704,770 B1* | 3/2004 | Ramakesavan | 709/205 |
| 6,735,347 B1* | 5/2004 | Bates et al. | 382/282 |
| 6,789,228 B1 | 9/2004 | Merril et al. | 715/500.1 |
| 6,826,729 B1 | 11/2004 | Giesen et al. | 715/837 |
| 6,924,797 B1 | 8/2005 | MacPhail | 345/326 |
| 6,944,821 B1* | 9/2005 | Bates et al. | 715/530 |
| 7,032,210 B2 | 4/2006 | Alloing et al. | 717/106 |
| 7,143,338 B2* | 11/2006 | Bauchot et al. | 715/503 |
| 7,165,098 B1 | 1/2007 | Boyer et al. | 709/219 |
| 7,184,955 B2 | 2/2007 | Obrador et al. | 704/231 |
| 7,188,073 B1 | 3/2007 | Tam et al. | 705/9 |
| 2001/0032214 A1* | 10/2001 | Bauchot et al. | 707/503 |
| 2002/0049785 A1* | 4/2002 | Bauchot | 707/503 |
| 2002/0091739 A1 | 7/2002 | Ferlitsch et al. | 707/526 |
| 2002/0099777 A1 | 7/2002 | Gupta et al. | 709/206 |
| 2002/0196293 A1 | 12/2002 | Suppan et al. | 345/853 |
| 2003/0014490 A1 | 1/2003 | Bates et al. | 709/206 |
| 2003/0020749 A1 | 1/2003 | Abu-Hakima et al. | 345/752 |
| 2003/0050927 A1 | 3/2003 | Hussam | 707/5 |
| 2003/0069877 A1 | 4/2003 | Grefenstette et al. | 707/2 |
| 2003/0135565 A1 | 7/2003 | Estrada | 709/206 |
| 2003/0154254 A1 | 8/2003 | Awasthi | 709/206 |
| 2003/0212680 A1 | 11/2003 | Bates et al. | 707/7 |
| 2004/0039779 A1 | 2/2004 | Armstrong et al. | 709/204 |
| 2004/0109033 A1 | 6/2004 | Vienneau et al. | 345/863 |
| 2004/0243677 A1 | 12/2004 | Curbow et al. | 709/206 |
| 2004/0267706 A1* | 12/2004 | Springer et al. | 707/3 |
| 2005/0010871 A1 | 1/2005 | Ruthfield et al. | 715/712 |
| 2005/0055424 A1* | 3/2005 | Smith | 709/219 |
| 2005/0183008 A1 | 8/2005 | Crider et al. | 715/517 |

OTHER PUBLICATIONS

IBM Corporation, "Source Dimension Copying using the Standard Clipboard", Technical Disclosure Bulletin, vol. 37, No. 8, pp. 419-420, Aug. 1994.*

IBM Corporation, "Multiple Item On-line Clipboard", Technical Disclosure Bulletin, No. 2, p. 425, Jul. 1992.*

M. Apperley et al., "Breaking the copy/paste cycle: The Stretchable Selection Tool", Computer Science Department, New Zealand, pp. 1-8, Feb. 2000.*

Microsoft Corporation; Microsoft® Snipping Tool for Tablet PC Preview Release Help: Capturing Clips; Capturing Regions; Displaying or Hiding Links; Nov. 2002.

Leszynski Group; News Story: Leszynski Group Powers Bill Gates' Tablet PC Launch Keynote; Nov. 2002.

Leszynski Group; Tablet PC Solutions; Nov. 2002.

U.S. Appl. No. 10/420,621, filed Apr. 22, 2003, entitled "Creation and Recognition of Specially-Marked Items in Notes".

U.S. Appl. No. 10/387,287, filed Mar. 12, 2003, entitled "System and Method for Customizing Note Flags".

U.S. Appl. No. 10/397,103, filed Mar. 27, 2003, entitled "System and Method for Linking Page Content with a Media File and Displaying the Links".

U.S. Appl. No. 10/955,232, filed Sep. 30, 2004, entitled "Method and System for Improved Electronic Task Flagging and Management".

U.S. Appl. No. 11/063,309, filed Feb. 22, 2005, entitled "System and Method for Linking Page Content with a Video Media File and Displaying the Links".

U.S. Official Action mailed Oct. 19, 2004 in U.S. Appl. No. 10/397,103.

U.S. Official Action mailed Sep. 23, 2005 in U.S. Appl. No. 10/420,621.

Rich, Charles and Sidner, Candace L., "Segmented Interaction History in a Collaborative Interface Agent," 1997 ACM, pp. 23-30.

Dwelly, Andrew, "Functions and Dynamic User Interfaces," 1989 ACM, pp. 371-381.

Kurtenbach, Gordon et al.., "The Hotbox: Efficient Access to a Large Number of Menu-items," ACM 1999, pp. 231-237.

Rich, Charles and Sidner, Candace L., "Adding a Collaborative Agent to Graphical User Interfaces," 1996 ACM, pp. 21-30.

Boyce, Jim, "Microsoft Outlook Inside Out," 2001, Redmond, Washington, pp. 67, 68, 109, 110, 230, 231, 310, 316-318, 798.

Halvorson, Michael and Young, Michael, "Microsoft Office XP Inside Out," 2001, Redmond, Washington, pp. 1005-1009, 1015, 1023-1028, 1036-1039, 1093.

Riggsby, Matt et al., "Mastering Lotus Notes and Domino 6," 2003, Alameda, California, pp. 135-139.

Riggsby, Matt, et al., "Mastering Lotus Notes and Domino 6," 2003, Alameda, California, pp. 135-138, 607-612.

"Primary Windows," date unknown (printed Feb. 23, 2007, 23 pages.

Schumaker, Dennis, "User Interface Standards," Sep. 2001, 5 pages.

Budinsky, F. et al., "WebSphere Studio Overview," May 6, 2004, 25 pages.

Padwick, Gordon, Ebook titled "Special Edition Using Microsoft Outlook 2002", published May 17, 2001, pp. 1-7.

"Evermore Integrated Office is the 'First REAL Office'", Evermore Software Ltd., 2001-2004, retrieved Jan. 24, 2007, 2 pp.

U.S. Official Action mailed Jun. 12, 2006 in U.S. Appl. No. 10/387,287.

U.S. Official Action mailed Jun. 13, 2006 in U.S. Appl. No. 10/420,621.

U.S. Official Action mailed Feb. 7, 2007 in U.S. Appl. No. 10/387,287.

U.S. Official Action mailed Feb. 20, 2007 in U.S. Appl. No. 10/420,621.

U.S. Official Action mailed Apr. 19, 1997 in U.S. Appl. No. 10/397,103.

U.S. Official Action mailed Jul. 16, 2007 in U.S. Appl. No. 11/063,309.

* cited by examiner

METHOD AND SYSTEM FOR PROVIDING DATA REFERENCE INFORMATION

TECHNICAL FIELD

The present invention is generally directed to computer software that can be used for collecting and/or researching data. More specifically, the present invention can provide reference information related to data that is copied using computer software.

BACKGROUND OF THE INVENTION

The advent of computing devices, such as desktop computers, laptop computers, and personal digital assistants, along with numerous software applications for such devices, has led to an increasing usage of computing devices to collect data (or information). Furthermore, the advent of various computing networks, such as local area networks (LAN), wide area networks (WAN), and the Internet, have further influenced the increasing usage of computing devices to collect data. Through the use of such software applications and computing networks, computing devices can be used to collect data for purposes ranging from important research projects (e.g., business or government related matters) to the leisurely review of topics of interest (e.g., hobbies, recreation, shopping, etc.).

Existing approaches for collecting data with computing devices typically allow a user to copy data from one application to another, which is often described as "copying" and "pasting" the data. For example, a laptop computer user conducting research may copy data from a web-browser application connected to the Internet and past the data to a note-taking/managing application to save it for further review. However, existing approaches for collecting data in this manner typically do not provide a practical means to refer back to the source of the data. For instance, in the case of the previous example, the laptop computer user may later need to refer back to the web-site from which the data was copied. But, the information needed for such reference is typically not available to the user unless it was manually recorded or a new search for the web-site is subsequently conducted.

In other instances, a user may need other reference information related to data that was collected using a computing device, such as the date and/or time the data was collected, the author of the data, the last editor of the data, the location of the data in a document, the user who collected the data, etc. Existing approaches typically do not provide such additional reference information either when data is collected with computing devices. As a result, a user may again have to resort to manually recording such reference information or conducting a subsequent review of a data source to obtain such reference information. Thus, collecting and researching data with computing devices using existing approaches can be impractically time and resource consuming.

In view of the foregoing, there is a need in the art for providing reference information related to data when it is collected with computing devices. Such reference information may include, but is not limited to, one or more of: the source of the data, the date and/or time the data was collected, the author of the data, the last editor of the data, the location of the data in a document, the user who collected the data, etc.

SUMMARY OF THE INVENTION

Exemplary embodiments of the present invention can provide reference information related to data (i.e., "data reference information") that is copied using computer software (i.e., one or more computer applications). The copied data may include any portion of content (e.g., text, graphics, etc.) from a document, page, spreadsheet, drawing, or other source that can provide the data for copying with computer software. The data reference information may be any available information that relates to the data, such as the source of the data, the date and/or time the data was copied or pasted, the author of the data, the last editor of the data, the last edit date and/or time of the data, the location of the data in a document, the user who copied or pasted the data, etc. By providing the data reference information along with the copied data, the invention can allow a user to refer to reference information related to copied data without consuming additional time and/or resources to find and/or record such reference information.

In a typical aspect of the present invention, a user can copy data from a first computer application, for example, in a document, page, spreadsheet, drawing, etc. The data can be copied to a memory. Reference data related to the copied data can also be copied to the memory, for example, by a module of the first computer application. A user can then paste the data to a second application, for example, in a document, page, spreadsheet, drawing, etc. The reference data related to the pasted data can also be pasted to the second computer application, so that a user can review the reference information along with the data, for example, to facilitate further research of the data.

In other aspects of the present invention, the copying and/or pasting of the data and data reference information, as described above, can occur among one or more documents, pages, spreadsheets, drawings, etc. in the same computer application. These and other aspects of the invention will be described further in the detailed description below in connection with the drawing set and claim set.

DETAILED DESCRIPTION OF THE EXEMPLARY EMBODIMENTS

Figure 1:
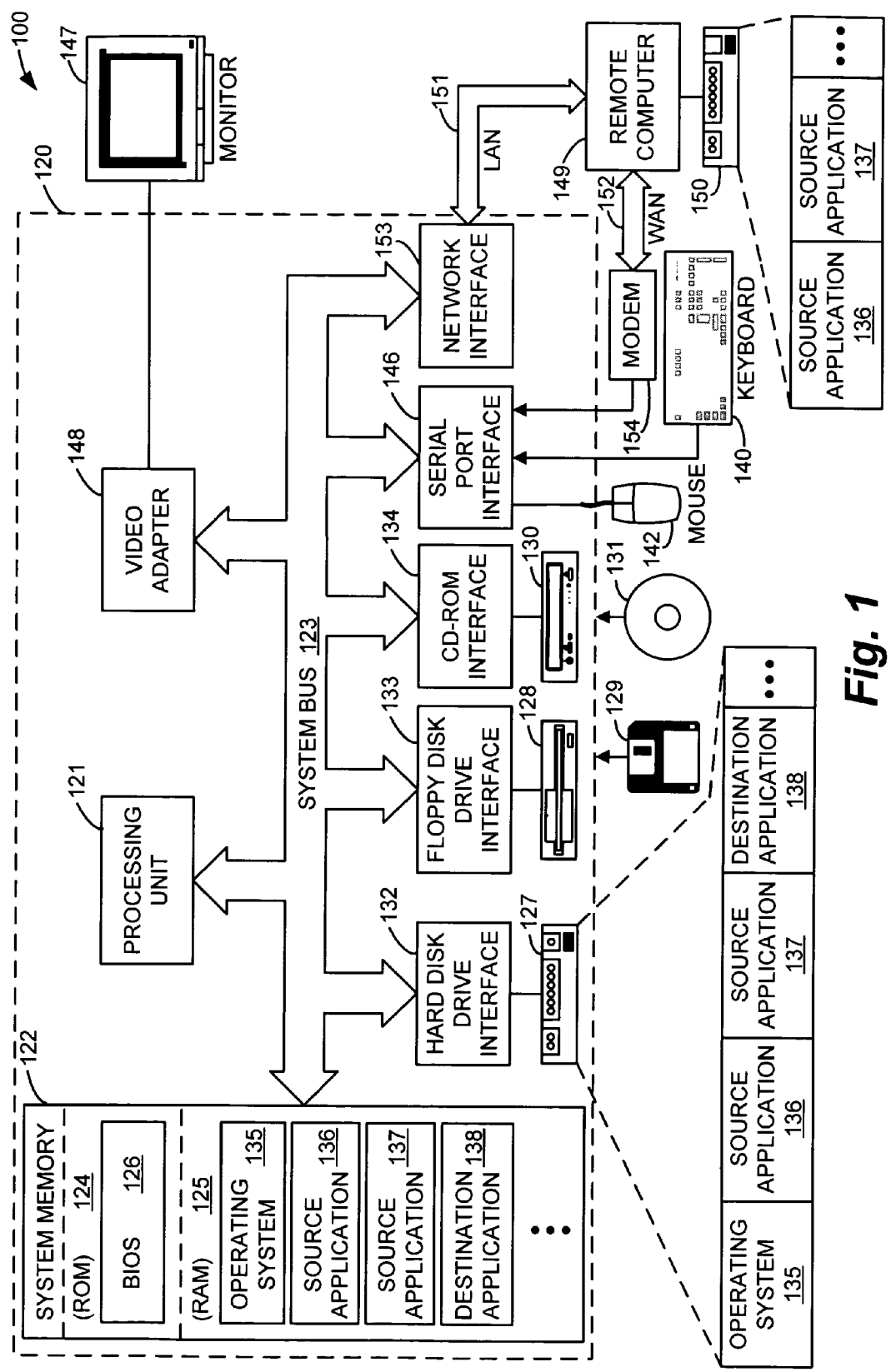
FIG. 1 is a block diagram illustrating an exemplary operating environment for implementing various exemplary embodiments of the present invention.

Reference will now be made in detail to exemplary embodiments of the present invention, examples of which are illustrated in the accompanying drawings. When possible, like elements will be indicated with like reference numbers in the drawings. Although exemplary embodiments of the present invention may be generally described in the context of software modules and an operating system running on a personal computer, those skilled in the art will recognize that the present invention can also be implemented in conjunction with other program modules for other types of computer system configurations, including handheld devices, multiprocessor systems, microprocessor based or programmable consumer electronics, network personal computers, minicomputers, mainframe computers, and the like. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices, and/or input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended logic flow diagrams (or flow charts). However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the present invention. The inventive functionality of the computer program will be explained in more detail in the following description in conjunction with the remaining figures illustrating the program flow.

Referring now to the drawings, in which like numerals represent like elements throughout the several figures, aspects of the present invention and an exemplary operating environment for the implementation of the present invention will be described.

FIG. 1 illustrates a representative operating environment 100 for implementation of an exemplary embodiment of the present invention. The exemplary operating environment 100 includes a general-purpose computing device in the form of a conventional personal computer 120. Generally, the personal computer 120 includes a processing unit 121, a system memory 122, and a system bus 123 that couples various system components including the system memory 122 to the processing unit 121. The system bus 123 may be any of several types of bus structures, including a memory bus or memory controller, a peripheral bus, or a local bus, using any of a variety of bus architectures. The system memory 122 includes a read-only memory (ROM) 124 and a random access memory (RAM) 125. A basic input/output system (BIOS) 126, containing the basic routines that help to transfer information between elements within the personal computer 120, such as during start-up, is stored in the ROM 124.

The personal computer 120 further includes a hard disk drive 127 for reading from and writing to a hard disk (not shown), a magnetic disk drive 128 for reading from or writing to a removable magnetic disk 129 such as a floppy disk, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical disk drive interface 134, respectively. Although the exemplary operating environment 100 employs a ROM 124, a RAM 125, a hard disk drive 127, a removable magnetic disk 129, and a removable optical disk 131, it should be appreciated by those skilled in the art that other types of computer readable media which can store data that is accessible by a computer may also be used in the exemplary operating environment 100, such as magnetic cassettes, flash memory cards, digital video disks, Bernoulli cartridges, and the like. The drives and their associated computer readable media can provide nonvolatile storage of computer-executable instructions, data structures, program modules, and other data for the personal computer 120.

A number of modules may be stored on the ROM 124, RAM 125, hard disk drive 127, magnetic disk 129, or optical disk 131, including an operating system 135 and various application modules 136-138. Application modules may include routines, sub-routines, programs, platforms, objects, components, data structures, etc., which perform particular tasks or implement particular abstract data types. In accordance with an exemplary embodiment of the present invention, the application modules may include one or more source applications 136-137 and destination applications 138, which will be described in more detail with respect to FIG. 2. The application modules 136-138 may include any of various types of software applications, such as, but not limited to, note-taking/managing applications, web-browsing applications, word-processing applications, spreadsheet applications, project management applications, desktop publishing applications, graphics drawing applications, etc. Exemplary embodiments of the present invention will be described below with respect to the application modules 136-138, including the source applications 136-137 and destination application 138.

A user may enter commands and information to the personal computer 120 through input devices, such as a keyboard 140 and a pointing device 142. The pointing device 142 may includes a mouse, a trackball, or an electronic pen that can be used in conjunction with an electronic tablet. Other input devices (not shown) may include a microphone, joystick, game pad, satellite dish, scanner, or the like. These and other input devices are often connected to the processing unit 122 through a serial port interface 146 that is coupled to the system bus 123, but may be connected by other interfaces, such as a parallel port, game port, a universal serial bus (USB), or the like. A display device 147, such as a monitor, may also be connected to system bus 123 via an interface, such as a video adapter 148. In addition to the display device 147, the personal computer 120 may include other peripheral output devices (not shown), such as speakers and a printer.

The personal computer 120 may operate in a networked environment using logical connections to one or more remote computers 149. The remote computer 149 may be another personal computer, a server, a client, a router, a network PC, a peer device, or other common network node. While the remote computer 149 typically includes many or all of the elements described above relative to the personal computer 120, only a memory storage device 150 has been illustrated in FIG. 1 for simplicity. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may also be stored in the remote memory storage deice 150. For example, the remote memory storage device 150 may include one or more source applications 136-137 as well. It will be appreciated that the network connections shown are exemplary and other means of establishing a communications link between the computers may be used.

Figure 2:
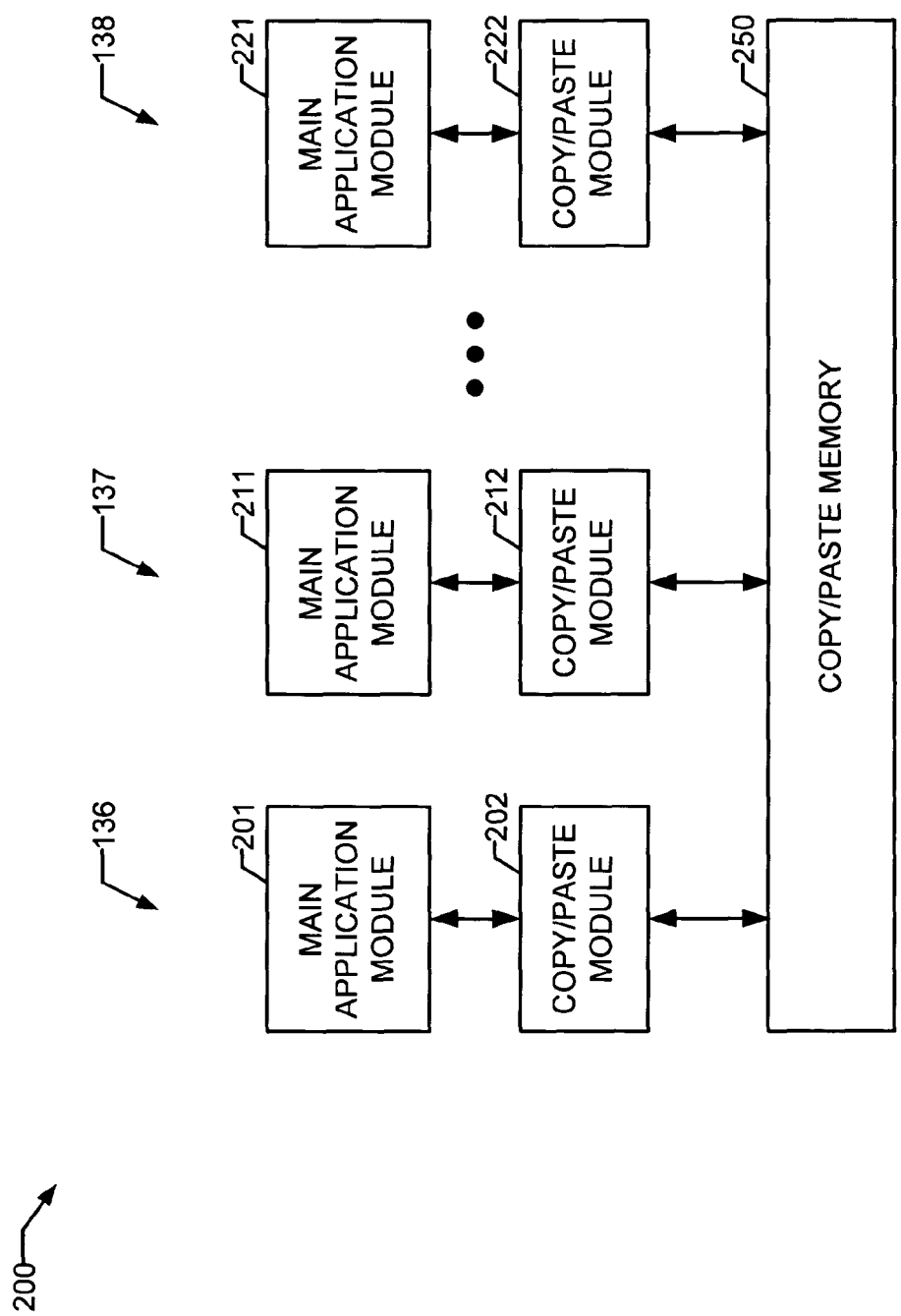
FIG. 2 is a block diagram illustrating an exemplary component architecture in accordance with various exemplary embodiments of the present invention.

Referring now to FIG. 2, a block diagram is shown that illustrates an exemplary component architecture 200 for one or more software applications, including source applications 136-137 and destination application 138, constructed in accordance with exemplary embodiments of the present invention. The source applications 136-137 and the destination application 138 may include similar or different types of software applications. For example, one or more of the applications may include note-taking/managing applications, web-browsing applications, word-processing applications, spreadsheet applications, project management applications, desktop publishing applications, graphics drawing applications, or any other type of applications software that can be executed on a computing device such as the personal computer 120 of FIG. 1.

As depicted in the exemplary architecture 200 of FIG. 2, the source applications 136-137 and the destination application 138 can have similar architectures in accordance with exemplary embodiments of the present invention. For example, the applications 136, 137, 138 can each include a main application module 201, 211, 221, respectively, and a copy/paste module 202, 212, 222, respectively. In accordance with exemplary embodiments of the present invention, one or more of the copy/paste modules 202, 212, 222 may be configured to provide reference information related to data that is collected using one or more of the applications 136, 137, 138, respectively, as will be discussed in more detail with respect to FIG. 3. The main application modules 201, 211, 221 can include one or more sub-modules and/or routines (not depicted) that are related to the purpose and/or function of the applications 136, 137, 138, respectively.

The main application modules 201, 211, 221 are typically in communication with the copy/past modules 202, 212, 222, respectively, as depicted in FIG. 2. Additionally, the copy/paste modules 202, 212, 222 and/or the main application modules 201, 211, 221 are typically in communication with a copy/paste memory 250. Although not depicted in FIG. 1, the copy/paste memory 250 can be included in the system memory 122 of the person computer 120, for example, in the random access memory (RAM) 125. As will be discussed in more detail with respect to FIG. 3, the copy/paste modules 201, 211, 221 of the applications 136, 137, 138, respectively, can function to copy data from one application and paste the data to another application. Furthermore, the copy/paste modules 201, 211, 221 can utilize the copy/paste memory 250 to perform such copy and paste functions.

The main application modules 201, 211, 221, copy/paste modules 202, 212, 222, and the copy/paste memory 250 can be implemented using various methods and/or systems, which may be known in the art. Furthermore, the foregoing elements may comprise discrete elements and/or one or more integrated elements in various embodiments of the invention. However, in contrast to existing approaches, one or more of the copy/paste modules 202, 212, 222 can be configured to provide reference information related to data collected from one or more of the applications 136-138 in accordance with exemplary embodiments of the present invention. These features of the exemplary embodiments of the present invention will be discussed in more detail below with respect to FIG. 3.

Figure 3:
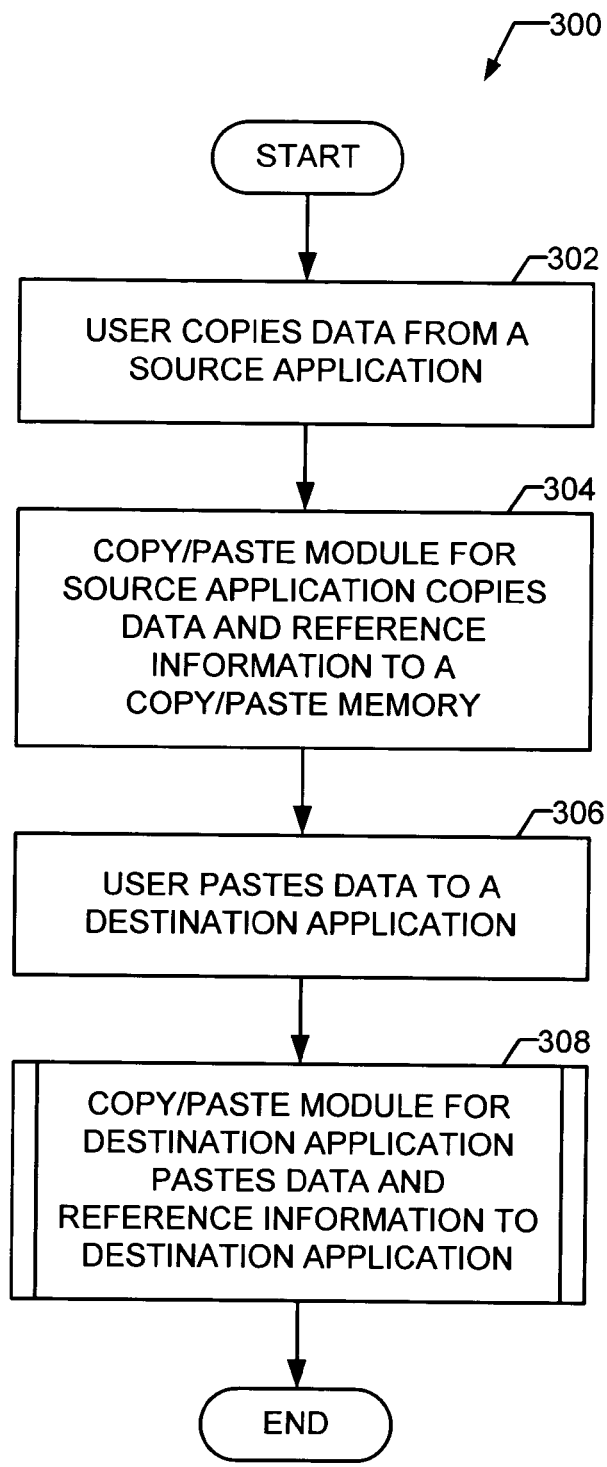
FIG. 3 is a logic flow diagram illustrating an exemplary general process for providing data reference information in accordance with various exemplary embodiments of the present invention.

Turning now to FIG. 3, a logic flow diagram is presented that illustrates an exemplary general process 300 for providing data reference information in accordance with various exemplary embodiments of the present invention. The description of the process 300 of FIG. 3, as well as related sub-processes, such as the sub-process 308 of FIG. 4, will be made with respect to elements introduced above for FIGS. 1 and 2, when feasible, to facilitate and/or simplify the description of exemplary embodiments of the present invention. However, it should be understood, and apparent to those skilled in the art, that embodiments of the present invention are not limited to implementations according to such references or descriptions. Furthermore, it should be understood, and apparent to those skilled in the art, that although exemplary embodiments of the invention are discussed below with respect to providing reference information related to data that is copied and pasted from a first software (or computer) application to a second software (or computer) application, the invention is not so limited. For example, the same or substantially similar elements, features, processes, etc. to those discussed below with respect to exemplary embodiments of the invention can be implemented to provide reference information related to data that is copied and pasted, for example, from a first document to a second document (or even within the same document) using the same software application, in accordance with various embodiments of the invention.

The exemplary process 300 of FIG. 3 begins with step 302 in which a user copies data from a source application 136 (or 137) using a computing device 120. This step 302 may occur, for example, when a user is collecting data for research or some other purpose using a computing device 120, and the user desires to copy (i.e., paste) the data to another application, such as a destination application 138, for later review. For example, the source application 136 may be a web-browser application that is connected to the Internet, and the destination application 138 may be a note-taking/managing application that is configured to save and organize data for future review and/or research purposes. The user may copy data according to step 302 by various means, which may known in the art. For example, the user may utilize a monitor 147 to locate the data, then use a mouse 142 to select the data, and finally use a keyboard 140 to enter the command to copy the data. In regard to step 302, data may include any portion of content (e.g., text, graphics, etc.) from a document, page, spreadsheet, drawing, or other source that can provide the data for copying in the source application. For example, data may be obtained from all or a portion of an Internet web-page or web-site, a word processing document, a spreadsheet page, a desktop publishing presentation, a project management document, a graphics drawing, etc.

From step 302, the exemplary process 300 proceeds to step 304 in which the copy/paste module 202 (or 212) for the source application 136 (or 137) copes the data to the copy/paste memory 250. In accordance with exemplary embodiments of the present invention, the copy/paste module 202 also copies reference information related to the copied data (i.e., "data reference information") to the copy/paste memory 250 during step 304. In this regard, such data reference information may be any available information that relates to the data, such as the source of the data, the date and/or time the data was copied, the author of the data, the last editor of the data, the last edit date and/or time of the data, the location of the data in a document, the user who copied the data, etc. Typically, the data reference information is not displayed with the data in the source application 136, but instead may be associated with the data in a background location (e.g., memory or hidden fields) or generated, for example, by the source application 136 when the data is copied by the copy/paste module 202. In accordance with some exemplary embodiments of the present invention, the user may be able to control what particular data reference information is copied along with the data, for example, by entering settings for the source application 136, or it may depend on predetermined configurations. Furthermore, the data reference information may be based on properties or meta-data that is generated by the source application 136 to describe the content of the source application 136, such as a document or web-page. As will be discussed further, with respect to routine 308, the reference data may be available in one or more formats, such as hyper-text mark-up language (HTML), text, various picture formats, etc.

Following step 304, the user pastes data to a destination application 138 in step 306 of the exemplary process 300. This step 306 may occur after a user has copied data, which is being collected for research or other purposes, from the source application 136 (e.g., step 302), and the user now desires to paste the data to a destination application 138 to review, save, etc. Thus, the example discussed above for step 302 may apply in this step 306. That is, the user may, for example, have copied the data from a web-browser application in step 302 and now desires to paste the copied data to a note-taking/managing application. As with step 302, the user may paste the data into the destination application 138 in step 304 by various means, which may be known in the art. For example, the user may utilize a monitor 147 and a mouse 142 to select the location to paste the data in the destination application 138 (e.g., in a document) and use a keyboard 140 to enter the command to past the data. It is noted that in some embodiments of the invention, a user may alternatively copy the data from the source application 136 and paste the data to the destination application 138 by, for example, using the mouse 142 and the monitor 147 to perform a "drag and drop" operation of the data from the source application 136 to the destination application 138, as is known in the art.

The exemplary process 300 concludes with routine 308 after step 306. In routine 308, which may include one or more sub-processes, the copy/paste module 222 for the destination application 138 pastes the data and data reference information to the destination application 138. In this regard, the copy/paste module 222 can obtain the copied data and data reference information from the copy/paste memory 250 and insert it in the destination application 138 (e.g., in a document or page). The copy/paste module 222 can paste the data and the data reference information into the destination application 138 in any conceivable format, including, but not limited to, the font, size, position, color, etc.

Figure 5:
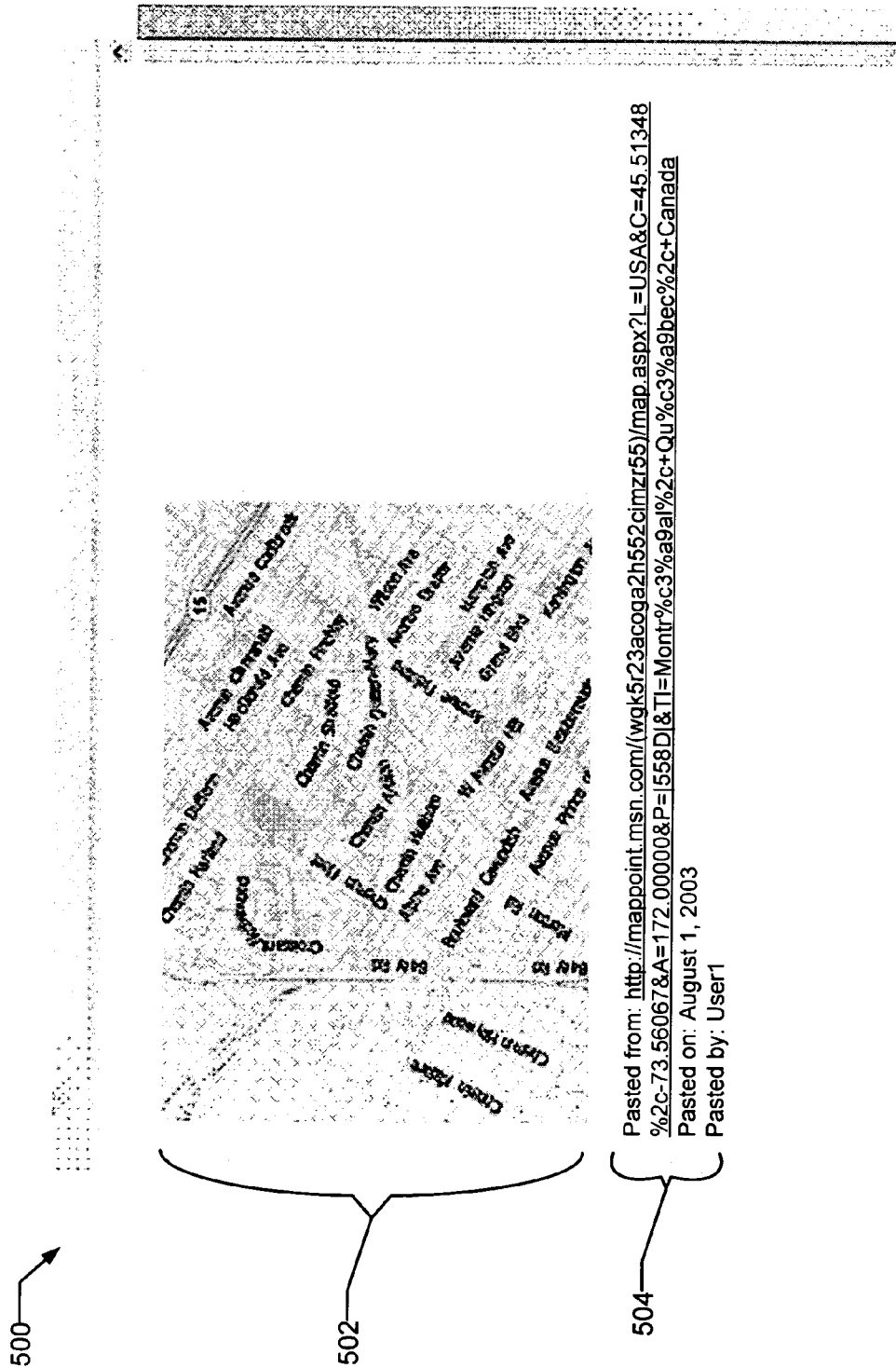
FIG. 5 is an exemplary screen view of collected data and related reference information in accordance with various exemplary embodiments of the present invention.
Figure 6:
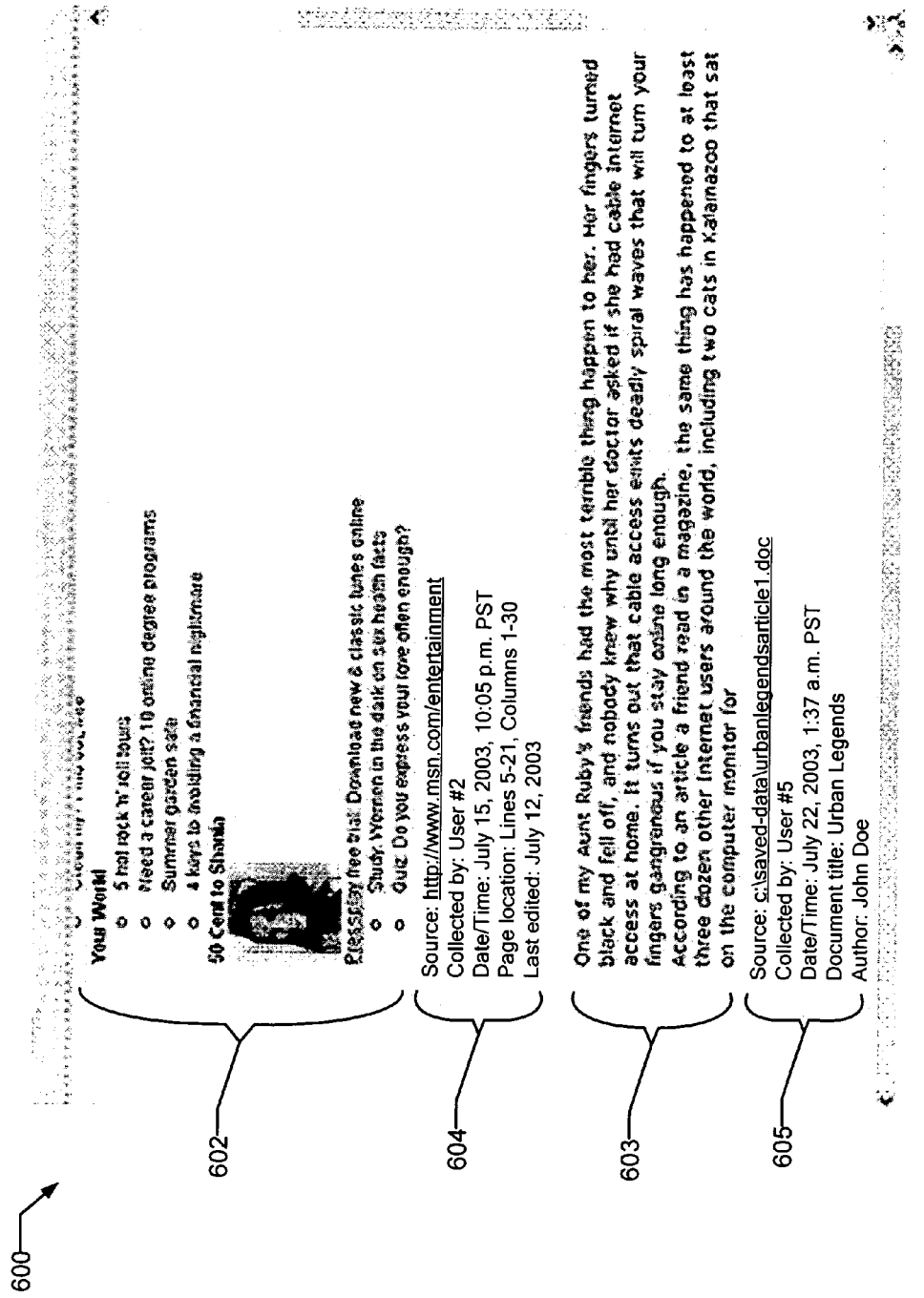
FIG. 6 is an alternate exemplary screen view of collected data and related reference information in accordance with various exemplary embodiments of the present invention.

As an example of possible formats, referring briefly to FIGS. 5 and 6, exemplary screen views 500, 600 of pasted data and related data reference information are depicted. As shown in FIGS. 5 and 6, the data and data reference information can be pasted in to the destination application 138 in a typical paragraphed document format, with the data reference information pasted below the data. However, as stated above, the data and data reference information can be pasted into the destination application 138 in any other format that may be desired, and the user may input settings to the destination application 138 to determine such format in some embodiments of the invention. It is further noted that the data and/or data reference information that is pasted to the destination application 138 during routine 308 can be pasted in a format that can be edited by a user according to exemplary embodiments of the invention. For example, if the pasted data is in the form of text or graphics, exemplary embodiments of the invention can paste the data in an editable format so that the text or graphics can be edited (e.g., by modifying the content, shape, size, color, etc.) or otherwise modified by the user after the data is pasted to the destination application 138.

Referring further to FIGS. 5 and 6 with respect to routine 308 of the exemplary process 300, it is noted that the data reference information can be pasted along with various descriptive labels or headings. For example, as shown in FIG. 5, the source of the data may be pasted after the label "Pasted from:". As another example, shown in FIG. 6, the source of the data may be pasted after the label "Source:". As shown, for example, in FIGS. 5 and 6, other descriptive labels can be included with the pasted data reference information, and such labels may depend on user settings in some embodiments of the invention. Furthermore, the labels or heading may be pasted in any position with respect to the data reference information, for example, just before the data reference information, as depicted in FIGS. 5 and 6.

It is further noted with respect to routine 308 that the data reference information may be obtained from the copy/paste memory 250 in various formats (e.g., presentation formats), depending, for example, on what formats are provided by the source application 136. For example, if the source application 136 is a web-browser, it may provide data reference information in an HTML format that is based on meta-data, which typically described the data presented in a web-browser application. As another example, if the source application 136 is a work-processing application, it may provide the data reference information in a text format that is based on property information, which typically describes the data presented in a word-processing application. It is noted that various source applications 136, 137 may provide data reference information in various formats, such as HTML, text, or picture formats, and that such source applications 136, 137 may provide the data reference information in more than one such format. Furthermore, it is noted that a user may have the ability to affect the format and content of the data reference information that is provided by the source application 136, for example, by user settings.

Since the data reference information may be obtained by the copy/paste module 222 in various formats during routine 308, the pasted data reference information may include active links to the references. For example, as depicted in FIGS. 5 and 6, the source data reference information for the data may be pasted as a uniform resource locator (URL), which can direct a user to the source when the URL is selected. In this regard, the URL may direct a user to, for example, a web-page, document, file, or any other source that can be referenced by a URL or comparable linking convention.

During routine 308, the copy/paste module 222 may also obtain data reference information from other applications, such as the destination application 138 or the other source application 137. For example, the copy/paste module 222 may obtain the date and/or time that the data was pasted to the destination application 138 from the destination application 138 or another application running on the computing device 120. The copy/paste module 222 also may select and paste certain data reference information from that which has been copied to the copy/paste memory 250, depending, for example, on user settings. Thus, as depicted in FIG. 5, a user may select to have data reference information 504 that includes the source, date and time, and the user ID pasted with the data. Alternatively, the user may select to have other data reference information 604, 605 included with the pasted data as depicted, for example, in FIG. 6.

In some embodiments of the invention, the copy/paste module 222 may paste all or some of the available data reference information from the copy/paste memory 250 based on, for example, predetermined configurations of the copy/paste module 222 or other module of the destination application 138. It is also noted that in some embodiments of the invention, the copy/paste module 222 may paste data reference information with the data depending on the characteristics of the data, such as the size, amount, or type of data that is pasted. This function of the copy/paste module 222 may be affected by user settings and/or predetermined configurations.

Figure 4:
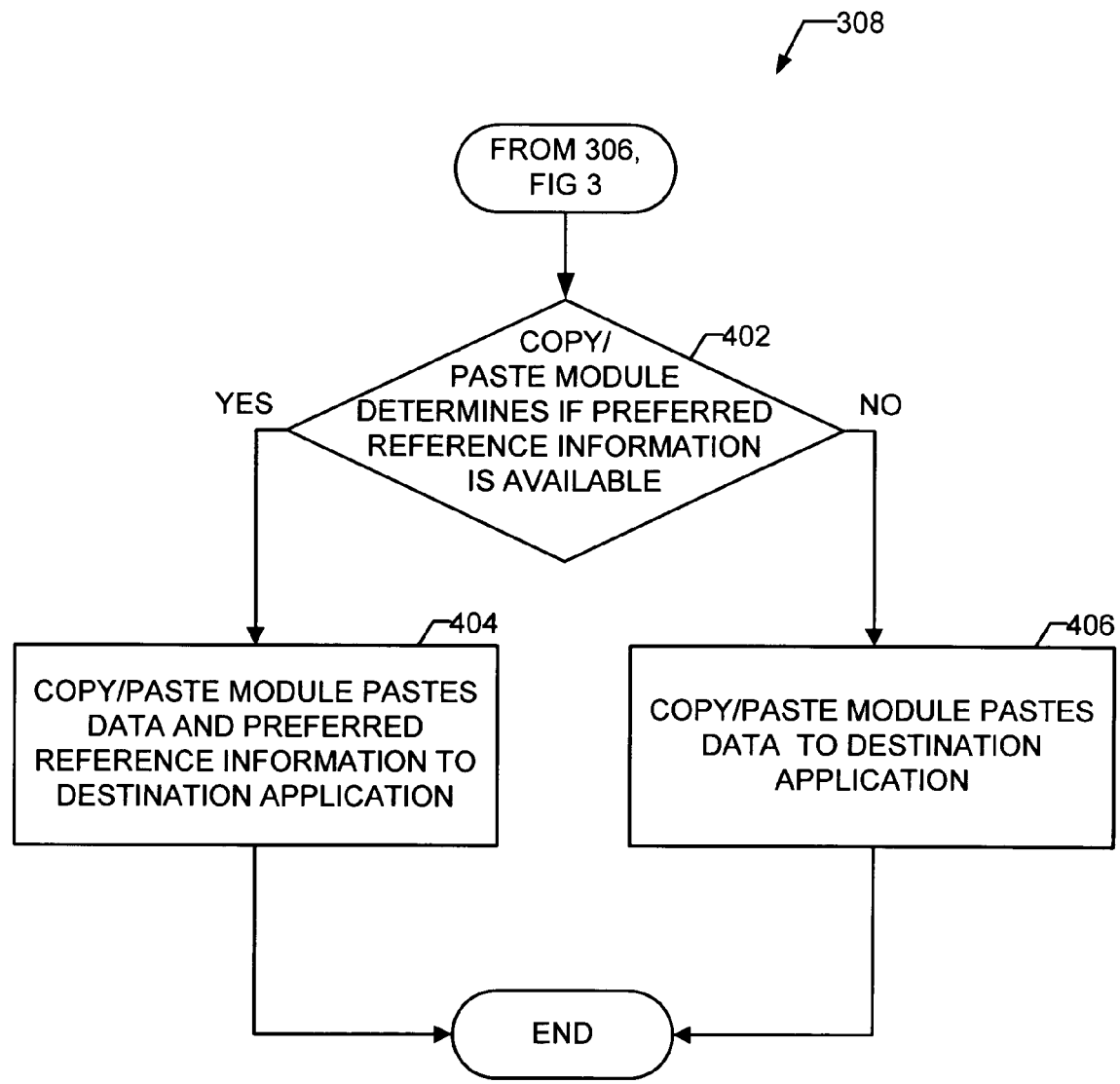
FIG. 4 is a logic flow diagram illustrating an exemplary sub-process for providing data reference information according to an exemplary embodiment of the present invention.

Referring to FIG. 4, a flow-chart illustrating a sub-process 308 of the routine 308 (FIG. 3) for providing data reference information is shown. The sub-process 308 begins with determination step 402 in which the copy/paste module 222 determines whether preferred data reference information is available. As discussed above for FIG. 3, the preferred data reference information may be based on factors such as, but not limited to, user settings or predetermined configurations. Furthermore, the data reference information may be available for pasting in one or more formats. Thus, the copy/paste module 222 may consider factors such as, but not limited to, the type of data reference information that is available (e.g., the source of the data, the date and/or time the data was pasted, the author of the data, etc., as discussed above for step 304) and the format (e.g., the presentation format, such as HTML, text, picture graphics, etc.) of the available data reference information during determination step 402. For example, the copy/paste module 222 may be configured to paste data reference information preferably if it is in an HTML format, but alternatively, if it is in text format. As another example, the copy/paste module 222 may be configured to paste available data reference information preferably if it relates to the source, author, and/or document title related to the pasted data.

In some embodiments of the invention, the copy/paste module 222 may implement determination step 402 by surveying the data reference information prior to pasting it to the destination application 138. For example, the copy/paste module 222 may parse the available data reference information in the copy/paste memory 250, obtain the desired format of data reference information as a stream of characters or other elements, and then configure the stream of data reference information into logical segments of different types of data reference information (e.g., the source). These logical segments of the data reference information may then be selected from according to the desired types of data reference information and pasted to the destination application 138 by the copy/paste module 222 along with, for example, generated descriptive labels or headings, as discussed above with respect to FIGS. 5 and 6.

Following the determination step 402, if the copy/paste module 222 determines that preferred data reference information is available, the exemplary sub-process 308 can proceed along the "Yes" branch to step 404. In step 404, the copy/paste module 222 pastes the data and the data reference information to the destination application 138 in an appropriate format, as discussed above for routine 308 (FIG. 3). However, if the copy/paste module 222 does not determine that there is preferred data reference information available, the sub-process 308 can proceed along the "No" branch to step 406. In step 406, the copy/paste module pastes the copied data to the destination application 138 without data reference information.

As discussed briefly above, FIGS. 5 and 6 show exemplary screen views 500, 600 of pasted data and related data reference information in accordance with various exemplary embodiments of the present invention. In that regard, FIG. 5 includes pasted data 502 and pasted data reference information 504. As discussed above with respect to routine 308 (FIG. 3), and exemplified in FIG. 5, the data 502 can be any form of content that can be copied from a source application 136 and pasted to a destination application 138. Thus, the data 502 depicted in FIG. 5 includes graphics and text. As also discussed above regarding routine 308, the data reference information 504 can be pasted to the destination application 138 in any format. For example, the data reference information in FIG. 5 is pasted in a paragraph format under the pasted data in some particular font, size, color, etc. Furthermore, descriptive labels have been appended to the data reference information 504 as discussed above for routine 308. In the example of the data reference information 504, the data source, the date the data was pasted, and the identity of the user who pasted the data are included. Moreover, the data source is presented as a URL which can be selected to direct a user to the source, for example, on a web-page.

FIG. 6 includes pasted data 602, 603, and respective pasted data reference information 604, 605. The data 602 includes text and graphics and the data 603 includes text. The respective data reference information 604, 605 is pasted in a paragraph format under the pasted data in some particular font, size, color, etc., which may different from each other and from that of the data reference information 504 in FIG. 5. Exemplifying the flexibility of data reference information that can be pasted to the destination application 138, it is noted that the data reference information 604 includes he source of the data, collector identity, date and time of pasting, location on the source page from which the data was copied, and the date that the copied data was last edited. While in comparison, the data reference information 605 includes the source of the data, collector identity, date and time of pasting, the title of the document from which the data was copied, and the author of the data. It is further noted that the source listed in the data reference information 605 is a URL that is directed to a file, for example, on the hard-disk drive 127 of the computing device 120. As discussed above, characteristics such as the type and format of the data reference information 604, 605 that is posted may depend on factors such as, but not limited to, user settings and predetermined configurations.

While there has been shown and described above several exemplary embodiments of the present invention, it will be evident to those skilled in the art that various modifications and changes may be made thereto without departing from the spirit and the scope of the present invention as set forth in the appended claims and equivalences thereof. Accordingly, it should be understood that the present invention is not limited to any of the exemplary embodiments, and should be considered with respect to the scope of the appended claims.

What is claimed is:

1. A method for providing data reference information, comprising:
    setting, on a second computer application, copy data characteristics of data, wherein the copy data characteristics indicates an amount of data that identifies when data reference information related to the data is automatically pasted to the second computer application, wherein the copy data characteristics include at least one member of a group comprising: a predetermined data size, a predetermined data amount, and a predetermined type of data;
    selecting data from a first computer application, wherein the first computer application is a Web-browser application, and wherein the Web-browser application provides the data reference information in an HTML format that is based on meta-data;
    copying the data from the first computer application to a memory;
    copying the copy data reference information related to the copied data from the first computer application to the memory;
    pasting the copied data from the memory to the second computer application; by accessing the copied data characteristics of data of the second computer application, determining when the amount of data of the copied data indicates that the copy data reference information related to the copied data is automatically pasted to the second computer application;
    automatically pasting the data reference information related to the copied data from the memory to the second computer application when the amount of data of the copied data indicates that the data reference information related to the copied data is automatically pasted to the second computer application;
    omitting the copy data reference information when the amount of data of the copied data does not indicate that the copy data reference information related to the copied data is automatically pasted to the second computer application;
    obtaining pasting data reference information from the second computer application, wherein obtaining pasting data reference information from the second computer application includes the second computer application copying the pasting reference information from a third computer application and pasting the pasting reference information to the second computer application so that the pasting reference information can be reviewed along with the reference information and wherein the pasting data reference information includes at least one member of a group comprising: the date the data was copied, the time the data was copied, the identity of the user who pasted the data, the identify of the user who copied the data, the date the data was pasted, and the time the data was pasted; and
    automatically pasting the pasting reference information from the memory to the second computer application.

2. The method of claim 1, wherein the pasting data reference information includes at least one descriptive label that identifies the pasted data reference information, wherein the descriptive label includes a heading related to the pasted data reference information.

3. The method of claim 2, wherein the at least one descriptive label relates to at least one member of a group comprising: the date the copied data was pasted, the time the copied data was pasted, and the identity of the user who pasted the data.

4. The method of claim 1, wherein obtaining pasting data reference information from the second computer application includes obtaining the pasting data reference information from a memory of the second computer application.

5. The method of claim 1, wherein obtaining pasting data reference information from the second computer application includes the second computer application accessing another computer application to obtain at least one member of a group comprising: the date the data was copied, the time the data was copied, and the identity of the user who copied the data.

6. The method of claim 1, wherein pasting the pasting data reference information related to the copied data comprises pasting the pasting data reference information adjacent to the copied data in a document of the second computer application.

7. The method of claim 1, wherein the first computer application and the second computer application comprise one computer application and the copied data is included within at least one document of the computer application.

8. The method of claim 1, wherein the copy data reference information includes an active link.

9. The method of claim 1, wherein the paste data reference information includes an active link.

10. A computer system for providing data reference information, comprising:
    a processing unit;
    a memory in communication with the processing unit;
    a computer application in communication with the processing unit and the memory that provides instructions to the processing unit, wherein the processing unit, responsive to the instructions, operates to perform the steps:

setting, on a second computer application, copy data characteristics of data, wherein the copy data characteristics indicates an amount of data that identifies when data reference information related to the data is automatically pasted to the second computer application, wherein the copy data characteristics include at least one member of a group comprising: a predetermined data size, a predetermined data amount, and a predetermined type of data;

selecting data from a first computer application, wherein the first computer application is a Web-browser application, and wherein the Web-browser application provides the data reference information in an HTML format that is based on meta-data;

copying the data from the first computer application to a memory;

copying the copy data reference information related to the copied data from the first computer application to the memory;

pasting the copied data from the memory to the second computer application;

by accessing the copied data characteristics of data of the second computer application, determining when the amount of data of the copied data indicates that the copy data reference information related to the copied data is automatically pasted to the second computer application;

automatically pasting the data reference information related to the copied data from the memory to the second computer application when the amount of data of the copied data indicates that the data reference information related to the copied data is automatically pasted to the second computer application;

omitting the copy data reference information when the amount of data of the copied data does not indicate that the copy data reference information related to the copied data is automatically pasted to the second computer application;

obtaining pasting data reference information from the second computer application, wherein obtaining pasting data reference information from the second computer application includes the second computer application copying the pasting reference information from a third computer application and pasting the pasting reference information to the second computer application so that the pasting reference information can be reviewed along with the reference information and wherein the pasting data reference information includes at least one member of a group comprising: the date the data was copied, the time the data was copied, the identity of the user who pasted the data, the identity of the user who copied the data, the date the data was pasted, and the time the data was pasted; and automatically pasting the pasting reference information from the memory to the second computer application.

11. The computer system of claim 10, wherein the pasting data reference information includes at least one descriptive label that identifies the pasted data reference information, wherein the descriptive label includes a heading related to the pasted data reference information.

12. The computer system of claim 10, wherein the processing unit, responsive to the instructions, operates for pasting the pasting data reference information related to the copied data by pasting from the memory to the second application at least one member of a group comprising: the date the copied data was pasted, the time the copied data was pasted, and the identity of the user who pasted the copied data.

13. The system of claim 10, wherein the copy data reference information includes an active link.

14. The system of claim 10, wherein the paste data reference information includes an active link.

15. A computer-readable storage medium having computer-executable instructions for providing data reference information, the instructions comprising:

setting, on a second computer application, copy data characteristics of data, wherein the copy data characteristics indicates an amount of data that identifies when data reference information related to the data is automatically pasted to the second computer application, wherein the copy data characteristics include at least one member of a group comprising: a predetermined data size, a predetermined data amount, and a predetermined type of data;

selecting data from a first computer application, wherein the first computer application is a Web-browser application, and wherein the Web-browser application provides the data reference information in an HTML format that is based on meta-data copying the data from the first computer application to a memory;

copying the copy data reference information related to the copied data from the first computer application to the memory;

pasting the copied data from the memory to the second computer application;

by accessing the copied data characteristics of data of the second computer application, determining when the amount of data of the copied data indicates that the copy data reference information related to the copied data is automatically pasted to the second computer application;

automatically pasting the date reference information related to the copied data from the memory to the second computer application when the amount of data of the copied data indicates that the data reference information related to the copied data is automatically pasted to the second computer application;

omitting the copy data reference information when the amount of data of the copied data does not indicate that the copy data reference information related to the copied data is automatically pasted to the second computer application;

obtaining pasting data reference information from the second computer application, wherein obtaining pasting data reference information from the second computer application includes the second computer application copying the pasting reference information from a third computer application and pasting the pasting reference information to the second computer application so that the pasting reference information can be reviewed along with the reference information and wherein the pasting data reference information includes at least one member of a group comprising: the date the data was copied, the time the data was copied, the identity of the user who pasted the data, the identity of the user who copied the data, the date the data was pasted, and the time the data was pasted; and automatically pasting the pasting reference information from the memory to the second computer application.

16. The computer-readable storage medium of claim 15, wherein the pasting data reference information includes at least one descriptive label that identifies the pasted data reference information, wherein the descriptive label includes a heading related to the pasted data reference information.

17. The computer-readable storage medium of claim 15, wherein the copy data reference information includes an active link.

18. The computer-readable storage medium of claim 15, wherein the paste data reference information includes an active link.

* * * * *

UNITED STATES PATENT AND TRADEMARK OFFICE
CERTIFICATE OF CORRECTION

| | |
|---|---|
| PATENT NO. | : 7,373,603 B1 |
| APPLICATION NO. | : 10/664740 |
| DATED | : May 13, 2008 |
| INVENTOR(S) | : Mark Yalovsky et al. |

It is certified that error appears in the above-identified patent and that said Letters Patent is hereby corrected as shown below:

In column 12, line 20, in Claim 1, delete "identify" and insert -- identity --, therefor.

In column 14, line 26, in Claim 15, after "meta-data" insert -- ; --.

In column 14, line 41, in Claim 15, delete "date" and insert -- data --, therefor.

Signed and Sealed this
Fifteenth Day of February, 2011

David J. Kappos
*Director of the United States Patent and Trademark Office*